3,233,970
METHOD OF PRODUCING BERYLLIUM OXIDE FROM BERYLLIUM CONTAINING ORES

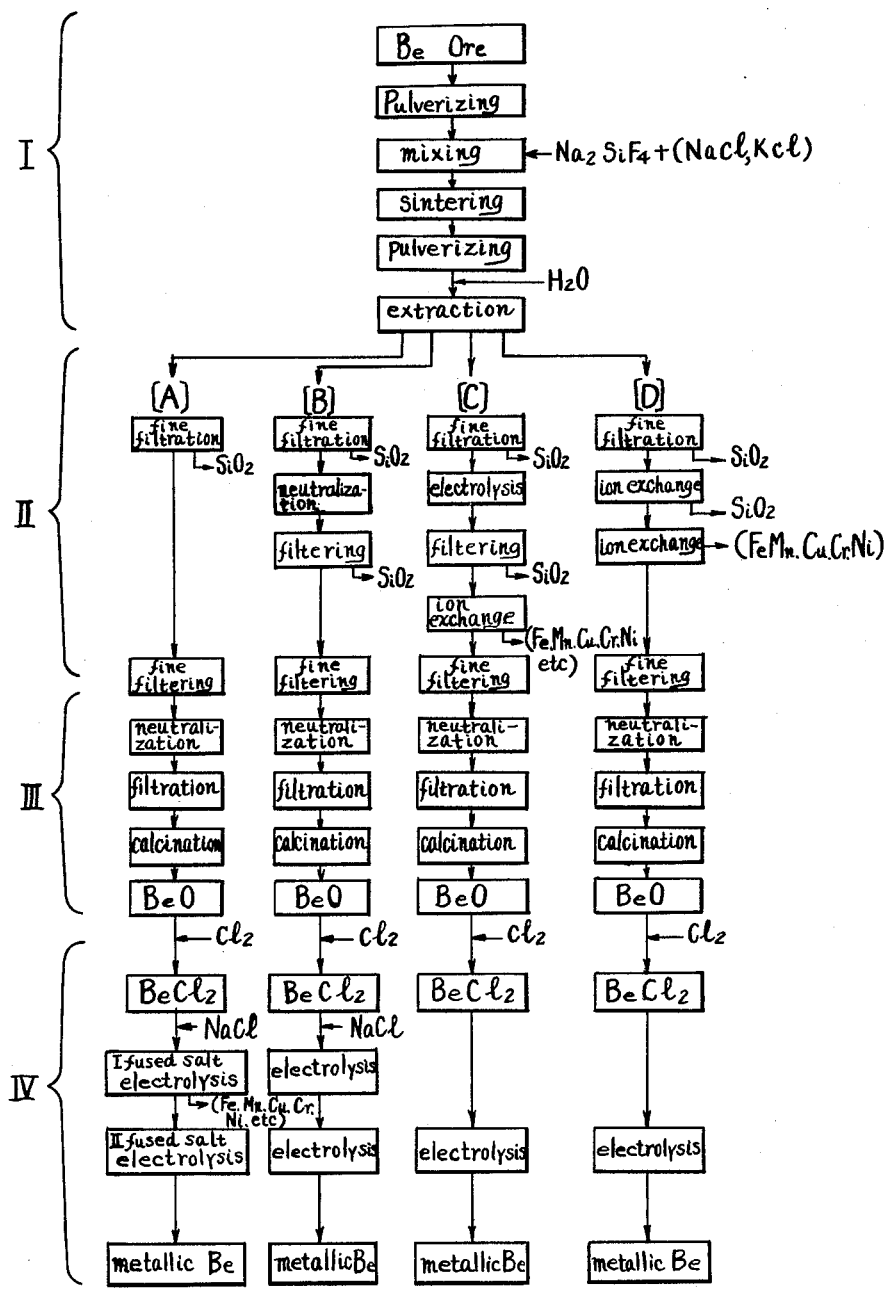

Katsuzo Kida, Mitsunobu Abe, and Susumu Nishigaki, Nagoya, Japan, assignors to The Nippon Gaishi Kaisha, Ltd., Nagoya, Japan, a corporation of Japan
Filed Jan. 26, 1962, Ser. No. 169,056
Claims priority, application Japan, June 14, 1961, 36/20,723
4 Claims. (Cl. 23—18.3)

The present invention relates to an improvement in the method of producing beryllium oxide from beryllium containing ores.

The principal object of the invention is to produce beryllium oxide at a lower cost with high purity.

In order to produce beryllium oxide commercially, the sulfuric acid process and the sodium silicofluoride process have heretofore been adopted. The sulfuric acid process, if compared with the sodium silicofluoride process, can not perfectly separate aluminum and other impurities and moreover, in order to obtain high purity oxide, it necessitates several additional steps of filtering processes to separate impurities so that it is more complicated and expensive. On the other hand, the sodium silicofluoride process effects easier separation of Al and is very effective as a process for producing beryllium oxide of about 90% purity by simple means, whilst on one hand sodium silicofluoride which is an auxiliary raw material is pretty expensive and moreover, generates poisonous gas of tetrasilicofluoride and the oxide contains substantial amount of silicon, iron and other impurities so that it is difficult to obtain high grade of purity. The essential feature of this invention lies in a method of producing beryllium oxide from a beryllium containing ore wherein the ore is first crushed into fine powder, mixed with sodium silico fluoride and an alkali metal chloride, sintered at a temperature of from about 700 to about 900° C. to form a water osluble alkali beryllium fluoride salt and various water insoluble oxides of certain of the impurities in the ore, crushing the sintered mixture, extracting the same with water, separating the insoluble residue from the extract by filtration, neutralizing the extract by addition of an alkali reagent to form a precipitate of beryllium hydroxide, recovering the precipitate by filtration, and calcining the precipitate at a temperature of at least 900° C. to produce beryllium oxide. Additional electrolysis and ion exchange steps may be included separately or in combination to remove various impurities not removable by filtration alone. As an example, a method for producing beryllium oxide from beryl will be explained. In this method, sodium silicofluoride is added to beryl and the mixture is sintered, then tetra-silicofluoride is produced by the following reaction:

$$2(3BeO \cdot Al_2O_3 \cdot 6SiO_2) + 6Na_2SiF_6 = 2Al_2O_3 + 15SiO_2 + 6Na_2BeF_4 + 3SiF_4 \quad (1)$$

The sintering reaction of beryl and sodium silicofluoride has heretofore been considered to occur according to the following Formula 2; but as the results of various investigations it has been found that the reaction according to the Formula 1 is correct.

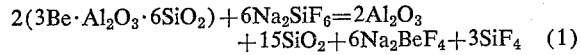

$$3BeO \cdot Al_2O_3 \cdot SiO_2 + 6Na_2SiF_6 = 9SiO_2 + 3Na_2BeF_4 + 2Na_3AlF_6 + 3SiF_4 \quad (2)$$

The tetra-silicofluoride thus produced reacts with sodium carbonate, and sodium silicofluoride is recovered as shown by the Formula 3 so that a substantial amount of sodium silicofluoride may be saved.

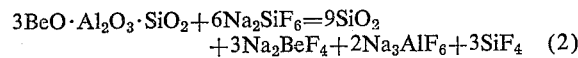

$$2Na_2CO_3 + 3SiF_4 = 2Na_2SiF_6 + SiO_2 + 2CO_2 \quad (3)$$

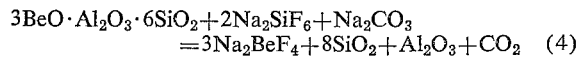

$$3BeO \cdot Al_2O_3 \cdot 6SiO_2 + 2Na_2SiF_6 + Na_2CO_3 = 3Na_2BeF_4 + 8SiO_2 + Al_2O_3 + CO_2 \quad (4)$$

It has heretofore been considered that sodium carbonate causes reactions as shown by the Formulae 5 and 6 so that it will react like the Formula 4. On the other hand, after the results of various investigations, it has been found that the Formulae 3 and 4 are reasonable.

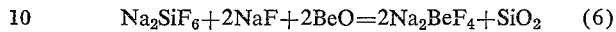

$$Na_2SiF_6 + 2Na_2CO_3 = 6NaF + 2CO_2 + SiO_2 \quad (5)$$
$$Na_2SiF_6 + 2NaF + 2BeO = 2Na_2BeF_4 + SiO_2 \quad (6)$$

(By the introduction of NaF the reaction of $Na_2SiF_6$ and $Al_2O_3$ can be prevented.)

In such improved methods, however, the formation of tetra-silicofluoride can not be perfectly prevented so that the recovery of sodium silicofluoride is not only poor but also there is no effect of increasing the yield of beryllium oxide and its purity. On the contrary, the hydrolysis of beryllium sodium fluoride ($Na_2BeF_4$) is augmented due to the alkali nature given by sodium carbonate and it decreases in yield and at the same time it induced the entrance of impurities from sodium carbonate. Thus it has been made clear that the effects of the conventional process and the improved process are not remarkable.

The present invention is intended to obviate the disadvantages of the above described methods and since tetra-silicofluoride formed by sintering a mixture of sodium silicofluoride and salts of alkali metals, such as NaCl, KCl and beryl can be almost perfectly collected and recovered as sodium silicofluoride or potassium silicofluoride the cost of raw material can be saved and almost no poisonous gas is generated during the sintering. That is very important in view of health. The method of the invention has characteristics that beryllium oxide having a high purity such as 99% can be produced from the extracted solution commercially at lower cost.

The invention will be explained further in detail in the following:

$SiF_4$ (tetra-silicofluoride) formed by the reaction of beryl and sodium silicofluoride reacts with NaCl or KCl according to the following Equations 7 and 8 to produce sodium silicofluoride or potassium silicofluoride which can be recovered.

$$4NaCl + 3SiF_4 = 2Na_2SiF_6 + SiCl_4 \quad (7)$$
$$4KCl + 3SiF_4 = 2K_2SiF_6 + SiCl_4 \quad (8)$$

The reaction of sintering a mixture of beryl and sodium silicofluoride and NaCl or KCl will occur according to the following Equations 9 and 10.

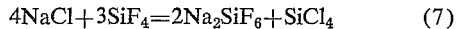
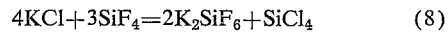

$$2(3BeO \cdot Al_2O_3 \cdot 6SiO_2) + 4Na_2SiF_6 + 4NaCl = 6Na_2BeF_4 + 2Al_2O_3 + 15SiO_2 + SiCl_4 \quad (9)$$

$$2(3BeO \cdot Al_2O_3 \cdot 6SiO_2) + 4Na_2SiF_6 + 4KCl = 4Na_2BeF_4 + 2K_2BeF_4 + 2Al_2O_3 + 15SiO_2 + SiCl_4 \quad (10)$$

In this case, iron in beryl cannot produce water soluble fluorine anion complex salt when there exists table salt, but it can be perfectly separated from the extracted solution as insoluble $Fe_2O_3$. Further, in sodium silicofluoride process there is disadvantage that a large quantity of $SiO_2$ might enter into the oxide, whilst such effect can be reduced by the addition of NaCl and it has been found that the content of $SiO_2$ in the oxide can be reduced lower than 2.0%. It is considered that it is due to the fact that the decomposition of $Na_2SiF_6$ or $K_2SiF_6$ is accelerated by the action of NaCl or KCl as shown by the Equations 11 and 12 so that unreacted $Na_2SiF_6$ or $K_2SiF_6$ would not remain in the sintered mass.

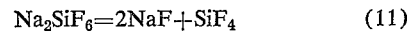

$$Na_2SiF_6 = 2NaF + SiF_4 \quad (11)$$
$$K_2SiF_6 = 2KF + SiF_4 \quad (12)$$

Further, beryllium sodium fluoride ($Na_2BeF_4$) or beryllium potassium fluoride in the extracted liquid is very stable in the neutral solution without causing hydrolysis and retained stable and it does not cause decrease in yield, while on the contrary, if sodium carbonate is used the solution becomes about 8 pH to cause hydrolysis according to the following Equations 13 and 14, thereby precipitating some $Be(OH)_2$.

$$Na_2BeF_4+2H_2O=2NaF+Be(OH)_2+2HF \quad (13)$$

$$K_2BeF_4+2H_2O=2KF+Be(OH)_2+2HF \quad (14)$$

Since $Na_2BeF_4$ thus produced is soluble in water it can be extracted with water. In this case, since the Si-component of about 0.5 to 2% coexists in the solution in the solution in the form of $H_2SiF_6$ and $Na_2SiO_3$ the Si-component can be separated as insoluble $Si(OH)_4$ with a small part of $Be(OH)_2$ by passing direct current through the solution from a graphite electrode according to the following equation:

$$Si^{4+}+4e^-+4H_2O \rightarrow Si(OH)_4\downarrow+4H_2\uparrow$$

As it adheres to the surface of the cathode in the form of white film which can be easily stripped off by interchanging the polarities of the electrodes or by superposing an alternating current and the stripped substance has a size well adapted for filtering and the Si-component can be eliminated by continuously passing electric current after the polarities have been interchanged.

In the neutral extracted solution thus obtained by the above process, any of Cu, Zn, Cd, Hg, Sn, Bi, V, Mo, Ta, Fe, Mn and Co etc. makes anion complex salts with fluorine, but its stability is smaller than that of fluorine complex salt of Be in cation exchange resin of RNa type so that most of these anion complex salts decomposes and exists in the form of cation as shown by the Equation 16.

$$Na_2BeF_4=2Na^++Be^{2+}+4F' \quad (15)$$

$$Na_2MnF_4=2Na^++Mn^{2+}+4F' \quad (16)$$

(KBe is very small in RNa ion exchange resin.)

Accordingly, by passing the extracted solution through cation exchange resins of Na type and by neutralizing with ammonium or caustic soda, beryllium oxide higher than 99% purity can be easily obtained. On the other hand, with the $Na_2CO_3$ process $Na_2BeF_4$ does not only hydrolyze to $Be(OH)_2$ but also as it is unstable and decomposes to $Be^{2+}$ so that the purification with cation exchange resins is impossible as shown by the Equation 17.

$$Na_2BeF_4 \rightarrow 2Na^++BeF_4'' \rightarrow 2Na^++Be^{2+}+4F'$$

Be is absorbed by the resin by the reaction of $$Rn \cdot X+Be^{2+} \rightarrow R_2 \cdot Be+X^{+n}$$

For a better understanding of the invention, reference is made to the accompanying drawings, which is a block diagram illustrating the operation system of the invention according to the order of the processes.

The process of manufacturing beryllium oxide according to the invention consists mainly of three steps I, II and III.

THE FIRST STEP (I)—EXTRACTION STEP

Berylliferous ores such as beryl is crushed into fine powders less than 80% 200 meshes and mixed with sodium silico fluoride and a salt of alkali metals, such as NaCl or KCl thereto and the mixture is sintered at a temperature of from 800 to 900° C., then it is crushed into fine powders of more than 80% 200 meshes and added with a large quantity (about more than 5 times) of water to effect water extraction and the extracted solution contains beryllium salt and other impurities ($SiO_2$, $Al_2O_3$ etc. and other salts of Fe, Mn, Cu, Cr, Ni etc.). This extract is treated by the next purification step to eliminate impurities. The extraction is preferably carried out at 20° C. to 60° C.

THE SECOND STEP (II)—PURIFICATION STEP

This process consists of a combination of four kinds of steps.

(A) Purification by filtration

In this step, at the first stage of the filtration precipitates of $SiO_2$, $Al_2O_3$ and other impurities are removed and at the second stage of filtration solid impurities in the form of colloidal particles greater than $0.1\mu$ are eliminated and Be remains dissolved in the solution in the form of $Na_2BeF_4$ and it can be separated. In this case, the metallic ions, such as, Fe, Mn, Cu, Cr, Ni and the like dissolved in the extracted solution cannot be separated, but the purification is limited to the filtration only with the object of eliminating the impurities in case of the later fused salt electrolytic purification to obtain metallic beryllium. The purity of BeO thus obtained is about 90%.

(B) Purification using filtration and electrolytic fine filtration

In this case, the purification step (A) is added with a step of electrolysis, and in the step the silicon remaining dissolved in the form of $Na_2SiO_3$ or $H_2SiF_6$ after the elimination of $SiO_2$ by the first filtration step is changed to insoluble $Si(OH)_4$ in the state of flock easily to be filtered out and in the succeeding fine filtration step the colloidal particles greater than $0.1\mu$ are removed.

The electrolysis is carried out by changing direct current polarities at 0.1 to 5 ma./cm.$^2$

(C) Purification using filtration and ion exchange treatment

In this case, metallic ions which could not be filtered out by the purification steps of (A) and (B) are to be purified by means of ion exchange resins.

(a) *Filtration—Ion exchange resin purifications—Fine filtration.*—The first filtration is to eliminate solid impurities, such as, $SiO_2$, $Al_2O_3$ etc. from the extracted solution containing beryllium dissolved in the state of $Na_2BeF_4$ and the succeeding ion exchange resin purification is to separate metallic ions of Fe, Mn, Cu, Cr, Ni etc. dissolved in the solution by means of ion exchange resins and the last step of fine filtration filters out solid impurities of colloidal particles greater than $0.1\mu$.

(D) Purification using filtration, electrolysis and ion exchange treatment

In this case, additional impurities which could not be filtered out by the purification steps of (A) and (B) are further purified by means of electrolysis and ion exchange resins.

(b) *Filtration — Electrolysis — Filtration — Ion exchange—Fine filtration.*—This step is a step in which the (C) (a) step is added with an electrolysis and a filtration in order to make $SiO_2$ to the state of flock to be finely filtered while the other steps are same as those described in the step (C) (a) step.

THE THIRD STEP (III)—BeO PRODUCING STEP

As the filtered products take the form of $Na_2BeF_4$ they are neutralized by injecting ammonium gas ($NH_4OH$) or sodium hydroxide (NaOH).

$$Na_2BeF_4+2NaOH \rightarrow Be(OH)_2+4NaF \quad (18)$$

$$Na_2BeF_4+2NH_4(OH) \rightarrow Be(OH)_2 \\ +Na_2(NH_4)_2 \cdot F_4 \quad (19)$$

By calcining the products beryllium oxide of 90% to 99.5% purity is obtained.

*Example 1.*—39% of beryl are finely pulverized to 50 to 80%, 200 meshes; to which are added 27% of sodium silicofluoride and 34% of table salt and after well mixed it is sintered at a temperature of 700 to 800° C., then it is finely crushed to more than 80 to 90% 200 meshes and extracted with warm water of 20 times quantity at 20 to 60° C. After the extracted solution is filtered by a ultra-filter, it is charged into an electrolytic cell having 2 sheets of graphite electrodes having 2 m.² of electrode area and is subjected to the electrolytic oxidation by passing direct current of 0.2 ma./cm.²–200 ma./cm.², then the white film of Si(OH)$_4$ containing a small quantity of Be(OH)$_2$ is created on the surface of the electrode. Hereupon, by interchanging the polarity of electrode or by superposing alternaitng current the white film may be stripped off. By repeating the above operation for 0.2 to 2 hours and after the completion of electrolysis Si(OH)$_4$ is filtered out and the filtrate is passed through cation exchange resins to remove impurities, then by injecting ammonium gas beryllium hydroxide is precipitated. The precipitate is calcined at a temperature of about 900° C. to obtain beryllium oxide which showed the following results by analysis:

| | Percent |
|---|---|
| Be | 99.5 |
| SiO$_2$ | 0.2 |
| Fe$_2$O$_3$ | 0.05 |
| Al$_2$O$_3$ | 0.05 |
| Remainder | 0.2 |
| Yield | 80 |

*Example 2.*—40% of beryl are finely pulverized to 50 to 80% 200 meshes, to which are added 40% of sodium silicofluoride and 20% of table salt and after well mixed, the mixture is heated to about 800° C. and finely crushed to above 80 to 90% 200 meshes, which is extracted with warm water of 20 times, then the extract is separated by means of an ultra-filter and the filtrate is passed through cation exchange resins to eliminate impurities and then caustic soda is added thereto to precipitate beryllium hydroxide which is calcined at a temperature of about 900° C. and the oxide thus obtained showed the following result of analysis:

| | Percent |
|---|---|
| BeO | 98.15 |
| SiO$_2$ | 1.2 |
| Fe$_2$O$_3$ | 0.08 |
| Al$_2$O$_3$ | 0.07 |
| Impurities | 0.5 |
| Yield | 85 |

*Example 3.*—33% of beryl are pulverized to 50 to 80% 200 meshes, to which are added 60% of sodium silicofluoride and 1% of table salt and after well mixed the mixture is heated to a temperature of from 800 to 900° C. it was finely crushed to 80 to 90% 200 meshes and extracted with warm water of 20 times and after the extract is filtered by means of an ultra-filter the filtrate is passed through cation exchange resins to eliminate ion impurities and the filtrate is added with caustic soda to precipitate beryllium hydroxide which is calcined at about 900° C. The oxide thus obtained showed the following results of analysis:

| | Percent |
|---|---|
| BeO | 97.8 |
| SiO$_2$ | 1.0 |
| Fe$_2$O$_3$ | 0.1 |
| Al$_2$O$_3$ | 0.1 |
| Impurities | 1.0 |
| Yield | 90 |

*Example 4.*—52% of beryl are finely crushed to 50 to 80% 200 meshes, to which are added 36% of sodium silicofluoride and 12% of potassium chloride and after well mixed it was sintered at about 800° C. and it is again pulverized to 80 to 90% 200 meshes and extracted with warm water at 20 to 60° C. of 10 times and after the extracted solution has been filtered the filtrate ammonium gas is injected in the filtrate beryllium hydroxide is precipitated and the precipitate is calcined at about 900° C. The oxide thus obtained shows the following analysis:

| | Percent |
|---|---|
| BeO | 98.17 |
| SiO$_2$ | 1.2 |
| Fe$_2$O$_3$ | 0.05 |
| Al$_2$O$_3$ | 0.08 |
| Remainder | 0.5 |
| Yield | 87 |

*Example 5.*—54% of beryl are finely crushed to 50 to 80% 200 meshes, to which are added 38% of sodium silicofluoride and 8% of lithium chloride and after sufficiently mixed and heated to about 700° C. it is again crushed into fine powders of 80 to 90% 200 meshes and extracted with warm water of 8 times. The extracted solution is filtered and the filtrate is passed through cation exchange resins to eliminate impurities, then ammonium solution is added thereto to precipitate beryllium hydroxide which is calcined to about 900° C. and the beryllium oxide thus obtained showed the following analysis:

| | Percent |
|---|---|
| BeO | 97.21 |
| SiO$_2$ | 2.1 |
| Fe$_2$O$_3$ | 0.04 |
| Al$_2$O$_3$ | 0.39 |
| Remainder | 0.20 |

*Example 6.*—Berylliferous ores such as beryl are crushed into fine powders of 50 to 80% below 200 meshes and 40% of this powder are added with 40% of sodium silicofluoride and 20% of NaCl and after well mixed, sintered at about 850° C., the sintered article was crushed into fine powders of 80 to 90% below 200 meshes and added with warm water at a temperature of 40° C.±20° C. to extract Na$_2$BeF$_4$ and while the residue is separated stationarily the supernatant liquid was filtered by means of an ultra-filter to remove solids above 2μ and then solid impurities above 0.1μ were filtered by means of a special porcelain filter and the filtrate was regulated to 9 to 10.8 pH by adding alkali to precipitate Be(OH)$_2$ which was filtered and after Be(OH)$_2$ paste was prepared it was calcined at a temperature of 1,000° C.±250° C. and BeO thus obtained showed the following results of analysis:

| | Percent |
|---|---|
| BeO | 90.5 |
| SiO$_2$ | 5 |
| Fe$_2$O$_3$ | 0.5 |
| Al$_2$O$_3$ | 1 |
| Impurities | 3 |
| Yield | 95 |

Though each of NaCl, KCl, RbCl, LiCl, CsCl has almost same action and effect, yet from the point of economy it is most advantageous to use NaCl and KCl.

What we claim is:

1. A method of producing beryllium oxide from an ore containing beryllium and various impurities comprising, in combination, the steps of crushing the ore into fine powder, mixing sodium silico fluoride and an alkali metal chloride with said powder to form a mixture, sintering said mixture at a temperature of from about 700 to 900° C., to form a water soluble alkali beryllium fluoride salt and water insoluble oxides of at least some of said impurities present including insoluble oxides selected from the group consisting of SiO$_2$, Al$_2$O$_3$ and combinations of the same, crushing the sintered mixture into fine sintered powder, extracting said sintered powder with water to form an extract including said water soluble alkali beryllium fluoride salt and a residue including said insoluble oxides, separating said residue from said extract by filtration of particles of greater than 0.1μ, neutralizing said extract by adding an alkali reagent to form a precipitate of beryllium hydroxide, recovering said precipitate by filtration, and calcining said precipitate at a temperature of at least 900° C. to produce beryllium oxide.

2. A method of producing beryllium oxide from an ore containing beryllium and various impurities comprising, in combination, the steps of crushing the ore into fine powder, mixing sodium silico fluoride and an alkali metal chloride with said powder to form a mixture, sintering said mixture at a temperature of from about 700 to 900° C., to form a water soluble alkali beryllium fluoride salt and water insoluble oxides of at least some of said impurities present including insoluble oxides selected from the group consisting of $SiO_2$, $Al_2O_3$ and combinations of the same, crushing the sintered mixture into fine sintered powder, extracting said sintered powder with water to form an extract including said water soluble alkali beryllium fluoride salt and a residue including said insoluble oxides, separating said residue from said extract by filtration of particles of greater than $0.1\mu$, treating the filtered extract with a strong basic ion exchange resin to separate any metallic ion impurities present including ions of metals selected from the group consisting of Cu, Zn, Cd, Hg, Sn, Bi, V, Mo, Ta, Fe, Mn, Co and combinations of the same, neutralizing the thus-treated extract by adding an alkali reagent to form a precipitate of beryllium hydroxide, recovering said precipitate by filtration, and calcining said precipitate at a temperature of at least 900° C. to produce beryllium oxide.

3. A method of producing beryllium oxide from an ore containing beryllium and various impurities comprising, in combination, the steps of crushing the ore into fine powder, mixing sodium silico fluoride and an alkali metal chloride with said powder to form a mixture, sintering said mixture at a temperature of from about 700 to 900° C., to form a water soluble alkali beryllium fluoride salt and water insoluble oxides of at least some of said impurities present including insoluble oxides selected from the group consisting of $SiO_2$, $Al_2O_3$ and combinations of the same, crushing the sintered mixture into fine sintered powder, extracting said sintered powder with water to form an extract including said water soluble alkali beryllium fluoride salt and a residue including said insoluble oxides, separating said residue from said extract by filtration of particles of greater than $0.1\mu$, electrolyzing the filtered extract to convert any water soluble $H_2SiF_6$ and $Na_2SiO_3$ present into water insoluble $Si(OH)_4$, separating said $Si(OH)_4$ by filtration of particles of greater than $0.1\mu$, neutralizing the thus-treated extract by adding an alkali reagent to form a precipitate of beryllium hydroxide, recovering said precipitate by filtration, and calcining said precipitate at a temperature of at least 900° C. to produce beryllium oxide.

4. A method of producing beryllium oxide from an ore containing beryllium and various impurities comprising, in combination, the steps of crushing the ore into fine powder, mixing sodium silico fluoride and an alkali metal chloride with said powder to form a mixture, sintering said mixture at a temperature of from about 700 to 900° C., to form a water soluble alkali beryllium fluoride salt and water insoluble oxides of at least some of said impurities present including insoluble oxides selected from the group consisting of $SiO_2$, $Al_2O_3$ and combinations of the same, crushing the sintered mixture into fine sintered powder, extracting said sintered powder with water to form an extract including said water soluble alkali beryllium fluoride salt and a residue including said insoluble oxides, separating said residue from said extract by filtration of particles of greater than $0.1\mu$, electrolyzing the filtered extract to convert any water soluble $H_2SiF_6$ and $Na_2SiO_3$ present to water insoluble $Si(OH)_4$, separating said $Si(OH)_4$ by filtration of particles greater than $0.1\mu$, treating the electrolyzed and filtered extract with a strong basic ion exchange resin to separate any metallic ion impurities present including ions of metals selected from the group consisting of Cu, Zn, Cd, Hg, Sn, Bi, V, Mo, Ta, Fe, Mn, Co and combinations of the same, neutralizing the thus-treated extract by adding an alkali reagent to form a precipitate of beryllium hydroxide recovering said precipitate by filtration, and calcining said precipitate at a temperature of at least 900° C. to produce beryllium oxide.

References Cited by the Examiner

UNITED STATES PATENTS

| | | |
|---|---|---|
| 1,858,771 | 5/1932 | Fischer. |
| 1,861,656 | 6/1932 | Claflin _____ 204—65 |
| 1,929,014 | 10/1933 | Claflin. |
| 2,209,131 | 7/1940 | Opatowski. |
| 2,974,011 | 3/1961 | Riabovol _____ 23—183 |
| 2,974,012 | 3/1961 | Cooperstein et al. ____ 23—183 |
| 2,987,454 | 6/1961 | Kopelman et al. _____ 204—65 |

OTHER REFERENCES

Calise et al.: Ind. and Eng. Chem., November 1949, pages 2554–2563.

Moore article, "Purification of Beryllium Compounds," ORNL–2938, date issued June 16, 1960, pages 2, 25, and 26, published by Oak Ridge National Laboratory, Oak Ridge, Tennessee.

Parikh and Kammermeyer: Ind. and Eng. Chem., July 1953, vol. 45, No. 7, pages 1583–1585.

Samuelson book, "Ion Exchange Separations in Anal. Chem.," 1963 ed., pages 331, 332, 334 and 336–338, John Wiley & Sons, N.Y.

Strelow article, Analytical Chem., pages 542–545, April 1961, vol. 33.

"Synthetic Ion-Exchangers," by G. H. Osborn (1961 ed.), page 177, Chapman & Hall, Ltd. London.

MAURICE A. BRINDISI, *Primary Examiner.*

JOHN R. SPECK, *Examiner.*